United States Patent [19]
McArthur

[11] Patent Number: 4,914,910
[45] Date of Patent: Apr. 10, 1990

[54] EMERGENCY POWER UNIT OXIDIZING GAS BOTTLE HEATING APPARATUS

[75] Inventor: Malcolm J. McArthur, San Diego, Calif.

[73] Assignee: Sundstrand Corporation, Rockford, Ill.

[21] Appl. No.: 218,875

[22] Filed: Jul. 14, 1988

[51] Int. Cl.$^4$ .............................................. F02C 7/10
[52] U.S. Cl. ................................. 60/39.511; 60/727
[58] Field of Search ............ 60/39.02, 39.142, 39.461, 60/39.511, 727, 260, 266, 267; 220/3

[56] References Cited

U.S. PATENT DOCUMENTS

| | | | |
|---|---|---|---|
| 693,872 | 2/1902 | Leavitt | 60/727 |
| 1,459,482 | 6/1923 | Underwood | 60/39.511 |
| 2,643,511 | 6/1953 | Briggs | 60/39.142 |
| 3,775,976 | 12/1973 | Kanig | 60/39.461 |
| 4,777,793 | 10/1988 | Weigand et al. | 60/727 |

FOREIGN PATENT DOCUMENTS 21756 11/1958 German Democratic Rep. ... 60/260

Primary Examiner—Louis J. Casaregola
Attorney, Agent, or Firm—Antonelli, Terry & Wands

[57] ABSTRACT

An emergency power unit for providing emergency on board power to an aircraft having apparatus for heating the oxidizing gas contained in the oxidizing gas bottle includes a fuel supply source (14) for supplying fuel, and oxidizing gas bottle (12) containing pressurized oxidizing gas, an oxidizing gas heating device (18) and (20) for heating the pressurized oxidizing gas within the oxidizing gas bottle (12) by using heat energy generated by a combustor (16) wherein the combustor (16) causes combustion of a mixture of fuel and oxidizing gas heated by the oxidizing gas heating device (18) and (20). Hot gases resulting from the combustion of the mixture of fuel and heated oxidizing gas drive the blades of a turbine (32) thereby producing emergency on board power to the aircraft.

6 Claims, 2 Drawing Sheets

EMERGENCY POWER UNIT OXIDIZING GAS BOTTLE HEATING APPARATUS

DESCRIPTION

TECHNICAL FIELD

The present invention relates to emergency power units for use in providing uninterruptable on board electric and hydraulic power for turbine powered aircraft during engine failure. More particularly, the present invention relates to an emergency power unit having apparatus for heating the oxidizing gas contained in an oxidizing gas bottle of an emergency power unit using the heat energy generated by a combustor.

BACKGROUND ART

As is known, jet aircraft have turbine engine(s) which provide propulsion power to maintain flight velocity and generate on board power which includes electrical and hydraulic power for controlling the control surfaces and the electrical loads of the aircraft.

For various reasons jet aircraft turbine engines are subject to engine failures which may occur at any time. The engine failures may occur at low altitudes where air for the combustion process is plentiful, or at high altitudes where air for the combustion process is not available in great quantities. Emergency power units (EPU's) provide necessary hydraulic and electrical power when all of the aircraft turbine engines fail and the air breathing auxiliary power unit, which is a conventional air aspirated turbine used for providing ground power for starting, etc., and may be used for providing in flight hydraulic and electrical power, cannot provide sufficient power to provide the necessary electrical and hydraulic power to maintain control of the flight surfaces. EPU's are designed to operate from stored fuel and oxidizer at all altitudes, in order to generate emergency on board electrical and hydraulic power during engine failures. The emergency on board electrical and hydraulic power permits the pilot of the aircraft to manipulate the control surfaces and electrical loads until the engines are restarted or until the aircraft can safely be landed.

EPU's are disclosed by U.S. Pat. Nos. 3,722,217; 3,800,534 and 4,033,115. The EPU's disclosed in the above listed patents generally create hot gases to drive the blades of a turbine by the decomposition of a fuel which supplies its own oxidizer, thus not having an oxidizing gas bottle.

Other conventional systems cause combustion of an air-fuel mixture with the air being supplied by an on-board air bottle with the fuel being a fuel such as JP4.

The conventional systems which supply air for combustion using an air bottle suffer from various disadvantages. Namely, when air from the air bottle is used, it is expanded (blown down) over a period of operation but still has to provide a usable pressure which is designed to achieve full output power that the EPU is designed to provide to satisfy potential peak hydraulic and electrical power demands. The expansion of the air from the air bottle causes the air to become cooler in the air bottle which has the effect of further reducing the available pressure and to supply cool air to the combustor.

The cool air being supplied to the combustor causes low temperature problems when mixed with liquid fuel in the combustor. The cool air in the bottle is reduced in pressure due to the contraction of the air which prevents a significant amount of the stored air from being used during operation of the EPU. Therefore, the full charge of air which is available at normal operating temperatures during flight is never used as a consequence of the foregoing cooling which occurs during operation of the EPU. As a consequence, the size of the air bottle must be proportionally increased to satisfy the requirement for cooled stored air which must be delivered during operation that is necessary to satisfy power requirements for the EPU. A weight penalty of 20 or more pounds is required for a typical system to provide the additional volume of the gas bottle to satisfy the EPU power requirements. Accordingly, there is a need for an emergency power unit which overcomes the above described disadvantages.

DISCLOSURE OF INVENTION

The present invention provides an emergency power unit for providing emergency on board power to an aircraft which efficiently uses oxidizing gas contained in an oxidizing gas bottle, weighs less than conventional emergency power units in that more of the gas in the gas bottle is used requiring less oxidizing gas to be carried and a smaller, lighter bottle may be used, and solves low temperature problems associated with the mixing of low temperature oxidizing gas with liquid fuel.

The present invention includes a fuel supply system for supplying fuel to the emergency power unit, an oxidizing gas bottle containing pressurized gas for use in the combustion process and a combustor which causes combustion of a mixture of oxidizing gas and fuel.

An oxidizing gas heating device adjacent to or inside the oxidizing gas bottle heats the oxidizing gas contained within the oxidizing gas bottle using heat energy generated by the combustor. The combustor communicates with the fuel supply system and the gas bottle to receive heated oxidizing gas provided by the oxidizing gas heating device and fuel from the fuel supply system. The combustor mixes the heated gas with the fuel and ignites the mixture causing combustion thereof. Expanding hot gases resulting from the combustion of the mixture of oxidizing gas and fuel drives the blades of a turbine which generates on board emergency electrical and hydraulic power for the aircraft.

Accurate control of the temperature of the oxidizing gas in the oxidizing gas bottle can be accomplished by the use of a controller which compares the temperature of the oxidizing gas in the oxidizing gas bottle to a set point and based on the results of the comparison, controls the position of a thermostatically controlled valve or a damper in proportion to the results of the comparison.

The present invention utilizes a heat carrying fluid which circulates in the oxidizing gas heating device utilizing heat energy generated by the combustor. The heat energy carried by the heat carrying fluid is used by the oxidizing gas heating device to heat the oxidizing gas within the oxidizing gas bottle. The heat carrying fluid may be oxidizing gas from the oxidizing gas bottle or alternatively, another heat carrying fluid.

A method of heating oxidizing gas contained within an oxidizing gas bottle of an emergency power unit in accordance with the invention includes supplying fuel for combustion within a combustor, providing an oxidizing gas bottle containing pressurized oxidizing gas, heating the oxidizing gas within the gas bottle by using heat energy generated by the combustor and burning a mixture of fuel and heated oxidized gas within the combustor with hot gases resulting from the combustion of heated oxidizing gas and fuel driving the blades of a turbine to generate electrical and hydraulic power. As used herein, the term "oxidizing gas" means a mixture of gases containing oxygen, such as air, as well as pure oxygen.

BEST MODE FOR CARRYING OUT THE INVENTION

Figure 1:
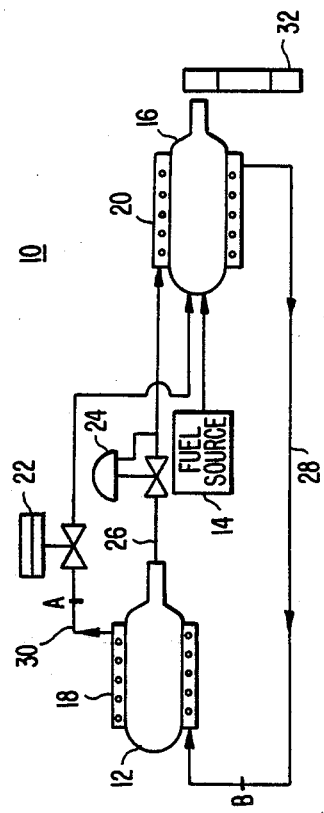
FIG. 1 illustrates a first embodiment of an emergency power unit according to the present invention.

FIG. 1 illustrates a first embodiment of an emergency power unit 10 in accordance with the present invention. The emergency power unit 10 includes an oxidizing gas bottle 12 containing pressurized oxidizing gas, a fuel source 14, a combustor 16 and an oxidizing gas heating device which includes an oxidizing gas bottle heat exchanger 18 and a combustor heat exchanger 20. A regulator 24 and throttle 22 are also shown which respectively regulate the pressure of oxidizing gas leaving the oxidizing gas bottle 12 and the flow of oxidizing gas to the combustor heat exchanger 20.

The oxidizing gas bottle 12 supplies oxidizing gas through a conduit 26 to regulator 24 and then to the combustor heat exchanger 20. The regulator 2 4 regulates the pressure of the oxidizing gas flowing from the oxidizing gas bottle 12 to the combustor heat exchanger 20 and eventually the throttle valve. Combustor heat exchanger 20 heats the oxidizing gas from the oxidizing gas bottle by use of the heat given off by the combustor 16 during the combustion process. The heated oxidizing gas from the combustor heat exchanger 20 then flows through conduit 28 to the oxidizing gas bottle heat exchanger 18 which causes the heat given off by the heated oxidizing gas from the combustor heat exchanger 20 to heat the oxidizing gas contained within the oxidizing gas bottle 12. The oxidizing gas from the oxidizing gas bottle heat exchanger 18 then flows through conduit 30 to throttle 22 which controls the flow of oxidizing gas from the oxidizing gas bottle heat exchanger 18 to the combustor 16 to control the rate of combustion. Heated oxidizing gas from the oxidizing gas bottle heat exchanger 18 is mixed with fuel from the fuel source 14 within the combustor 16. The mixture is then ignited, causing combustion of the heated oxidizing gas and fuel mixture which produces expanding hot gases. The expanding hot gases exit from the combustor, driving the blades of a turbine 32 which generates on board emergency electrical and hydraulic power to the aircraft.

As is apparent from the above described embodiment, oxidizing gas from the oxidizing gas bottle 12 is heated before it is mixed with fuel for combustion in the combustor 16. Heating of the oxidizing gas within the oxidizing gas bottle 12 increases the efficiency of the emergency power unit in that less oxidizing gas remains in the oxidizing gas bottle after blow down of the oxidizing gas to a usable pressure, and the problems associated with mixing low temperature oxidizing gas with liquid fuel are eliminated. Furthermore, the size of the oxidizing gas bottle may be downsized as a result of heating of the stored oxidizing gas.

Figure 2:
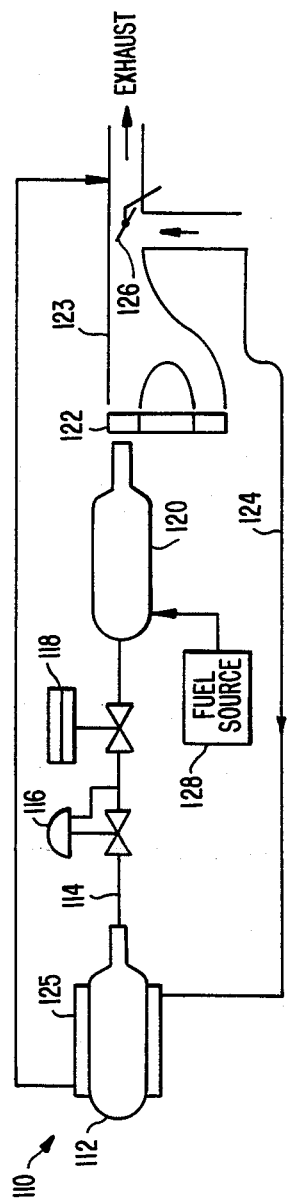
FIG. 2 illustrates a second embodiment of an emergency power unit according to the present invention.

A second embodiment of the emergency power unit 110 of the present invention is illustrated in FIG. 2. The emergency power unit 110 includes an oxidizing gas bottle 112 from which flows oxidizing gas through a conduit 114, to a regulator 116, then to a throttle 118 which supplies the oxidizing gas to a combustor 120. The functions of the regulator 116 and throttle 118 are the same as the embodiment of FIG. 1. A turbine 122 is driven by expanding hot gases, resulting from the combustion of the oxidizing gas and fuel mixture, exiting from the combustor 120. An exhaust conduit 123 channels combustion product from the combustor 120 to the atmosphere. A hot gas conduit 124 communicates with the exhaust conduit 123 and an bottle heat exchanger 125. A damper 126 is positioned within the hot gases conduit 124 near the interface of the hot gases conduit 124 and the exhaust conduit 123. The second embodiment operates similar to the first embodiment except for the following.

As shown in FIG. 2, expanding hot gases exiting from the combustor 120 through the turbine 122 and the exhaust conduit 123 is diverted by a damper 126 to the oxidizing gas bottle heat exchanger 125 through hot gases conduit 124. The oxidizing gas bottle heat exchanger 125 is adjacent the air bottle 112. Heat energy from the diverted hot gases causes the oxidizing gas bottle heat exchanger 125 to heat the oxidizing gas within the oxidizing gas bottle 112. The heated oxidizing gas from the oxidizing gas bottle 112 flows to combustor 120 through the conduit 114, which, as described above, communicates with a regulator 116 which regulates the pressure of the oxidizing gas flowing therein, and a throttle 118 which controls the flow of heated oxidizing gas to control the rate of generation of emergency power. Fuel from a fuel source 128 is also supplied to the combustor 120. The combustor 120 mixes the heated oxidizing gas and fuel, ignites the mixture thereby causing combustion which expels hot gases through exhaust conduit 123. The hot gases drive the blades of a turbine and a portion is diverted to oxidizing gas bottle heat exchanger 125.

Figure 3:
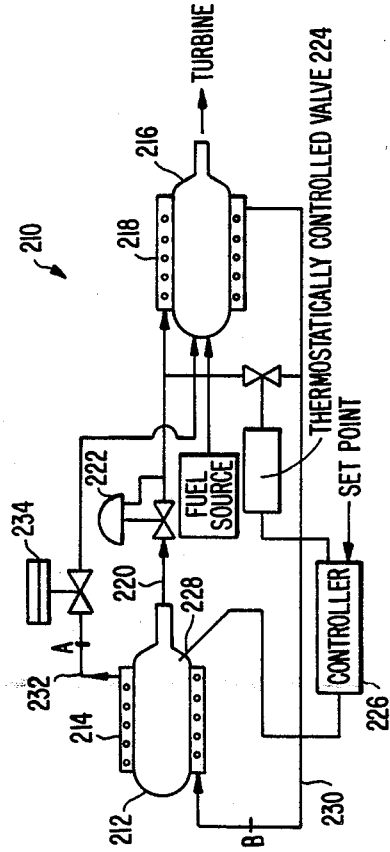
FIG. 3 illustrates a third embodiment of an emergency power unit according to the present invention.

FIG. 3 illustrates a third embodiment 210 of the emergency power unit of the present invention. The emergency power unit 210 shown in FIG. 3 includes an oxidizing gas bottle 212, an oxidizing gas bottle heat exchanger 214 adjacent the oxidizing gas bottle 212, a combustor 216 and a combustor heat exchanger 218 adjacent the combustor 216. Oxidizing gas from the oxidizing gas bottle 212 is supplied through conduit 220 which communicates with a regulator 222, and combustor heat exchanger 218. A thermostatically controlled valve 224 also communicates with conduit 220 at a point of interface between conduit 220 and combustor heat exchanger 218 and with conduit 230 at a point of interface between conduit 230 and combustor heat exchanger 218. The thermostatically controlled valve 224, responds to a controller 226 having a set point therein which is compared to a temperature signal output by a temperature sensor 228 which senses the temperature of the oxidizing gas in the oxidizing gas bottle 212. When the temperature of the oxidizing gas inside the bottle 212 exceeds the set point, the controller 226 causes the thermostatically controlled valve 224 to divert a controlled portion or all of the flow of oxidizing gas from conduit 220 to conduit 230 thereby channeling the oxidizing gas to the oxidizing gas bottle heat exchanger 214 bypassing the combustor heat exchanger 218.

When the temperature within the oxidizing gas bottle 212 is less than the set point within the controller 226, the thermostatically controlled valve 224 permits the oxidizing gas to flow from the oxidizing gas bottle 212, to the combustor heat exchanger 218. Oxidizing gas heated by the combustor heat exchanger 218 flows through conduit 230 to the oxidizing gas bottle heat exchanger 214. The oxidizing gas bottle heat exchanger 214 then supplies the heated oxidizing gas through conduit 232 to combustor 216. A throttle 234 communicating with conduit 232 increases or decreases the flow of heated oxidizing gas to combustor 216. The heated oxidizing gas from conduit 232 is mixed with fuel from fuel source 236 and ignited by the combustor 216 causing combustion. The resultant expanding hot gases exiting from the combustor 216 drive the blades of a turbine. The third embodiment as described above provides an apparatus for accurately controlling the temperature of the heated air for increasing the efficiency of the emergency power unit of the present invention.

Figure 4:
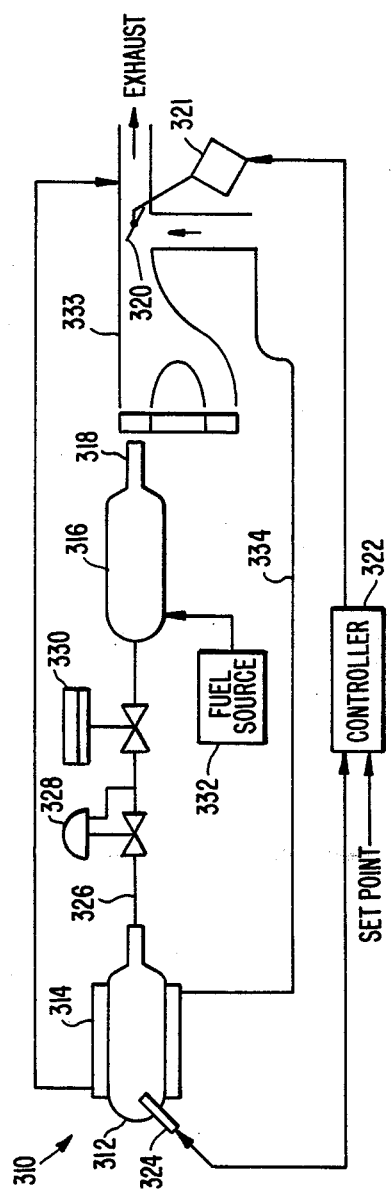
FIG. 4 illustrates a fourth embodiment of an emergency power unit according to the present invention.

A fourth embodiment of the emergency power unit 310 of the present invention is shown in FIG. 4. The fourth embodiment includes an oxidizing gas bottle 312, an oxidizing gas bottle heat exchanger 314 adjacent the oxidizing gas bottle 312, a combustor 316, a turbine 318, a damper 320 and a damper actuator 321. A controller 322 is provided having a set point and a temperature sensor 324 which senses the temperature of the oxidizing gas within the oxidizing gas bottle 312.

Oxidizing gas from the oxidizing gas bottle 312 flows through conduit 326 to regulator 328, throttle 330 then to combustor 316. The regulator 328 regulates the pressure of oxidizing gas flowing in conduit 326 and the throttle 330 increases or decreases the flow of oxidizing gas from the oxidizing gas bottle 312 to combustor 316. Air from the air bottle flowing through conduit 326 to combustor 316 is mixed with fuel from fuel source 332 by the combustor 316 and ignited causing combustion of the mixture. The combustion process expels expanding hot gases through exhaust conduit 333 which drive the blades of turbine 318. The hot gases are diverted by damper 320 to hot gases conduit 334 which channels the hot gases to the air bottle heat exchanger 314. The position of damper 320 is controlled by damper actuator 321 in order to increase or decrease the flow of hot gases to the oxidizing gas bottle heat exchanger 314. The damper actuator 321 operates in response to controller 322 which provides a control signal based on a comparison of the temperature sensed by temperature sensor 324 to the set point within the controller 322. If the temperature of the oxidizing gas in the oxidizing gas bottle 312 is above the set point, then the damper 320 is operated to decrease the flow of oxidizing gas in conduit 334. If the temperature of the oxidizing gas in the oxidizing gas bottle 312 is less than the set point then the damper 320 is operated to increase the flow of hot gases in conduit 334. The fourth embodiment is similar to the third embodiment in that accurate control of the temperature of the oxidizing gas within the oxidizing gas bottle is accomplished thereby increasing the efficiency of the emergency power unit of the present invention.

Generally, each of the embodiments of the emergency power unit embodying the principles of the present invention are designed to heat the oxidizing gas contained within the oxidizing gas bottle causing more of the oxidizing gas contained therein to be used in the combustion process. Thus, the weight of the oxidizing gas bottle in the present invention is reduced over conventional systems in that more usable oxidizing gas is available in the present invention and the size of the oxidizing gas bottle is reduced. The heating of the oxidizing gas within the oxidizing gas bottle also minimizes the problems associated with low temperature oxidizing gas mixing with liquid fuel in the combustor. Still further, the present invention aids in maintaining the minimal pressure needed for operation of the emergency power unit for a longer period time for a given oxidizing gas bottle. Therefore, the present invention as described above provides an efficient emergency power unit.

While the invention has been described in terms of its preferred embodiments, numerous modifications may be made thereto without departure from the spirit and scope of the invention. It is intended that all such modifications fall within the scope of the appended claims.

I claim:

1. An emergency power unit for providing emergency on board power to an aircraft comprising:
    a fuel supply source for supplying fuel;
    an oxidizing gas bottle containing pressurized oxidizing gas;
    an oxidating gas heating device, thermally coupled to a combustor and to said pressurized oxidizing gas bottle, for heating said pressurized oxidizing gas within said oxidizing gas bottle by using heat energy generated by said combustor; and
    said combustor, coupled to said fuel supply source and said oxidizing gas bottle, for combusting a mixture of fuel and heated oxidizing gas heated by said oxidizing gas heating device to produce hot gases resulting from the combustion of said mixture of fuel and heated oxidizing gas to drive blades of a turbine to produce emergency on board power for the aircraft;
    wherein said oxidizing gas heating device includes:
    a heat exchanger for transferring heat energy from said combustor to said oxidizing gas bottle to cause said pressurized oxidizing gas contained within said oxidizing gas bottle to become heated;
    said heat exchanger including
    a combustor heat exchanger thermally coupled to said combustor and an oxidizing gas bottle heat exchanger thermally coupled to said oxidizing gas bottle and communicating with said combustor heat exchanger; and
    wherein a heat carrying fluid circulates between said combustor heat exchanger and said oxidizing gas bottle heat exchanger.

2. An emergency power unit according to claim 1 wherein:
    said heat carrying fluid which is circulated between said oxidizing gas bottle heat exchanger and said combustor heat exchanger carries heat energy from said combustor heat exchanger to said oxidizing gas bottle heat exchanger; and
    wherein heat energy being carried by said heat carrying fluid from said combustor heat exchanger to said oxidizing gas bottle heat exchanger causes said oxidizing gas bottle heat exchanger to heat said pressurized oxidizing gas within said oxidizing gas bottle.

3. An emergency power unit according to claim 2 wherein:

said pressurized oxidizing gas from said oxidizing gas bottle serves as said heat carrying fluid for carrying heat energy from said combustor heat exchanger to said oxidizing gas bottle heat exchanger;

wherein said oxidizing gas bottle communicates with said combustor heat exchanger and said oxidizing gas bottle heat exchanger communicates with said combustor; and wherein said pressurized oxidizing gas serving as said heat carrying fluid is circulated between said combustor heat exchanger and said oxidizing gas bottle heat exchanger and is supplied by said oxidizing gas bottle heat exchanger to said combustor as heated oxidizing gas.

4. An emergency power unit according to claim 3, further comprising:

a throttle disposed between said oxidizing gas bottle heat exchanger and said combustor for controlling the flow of heated oxidizing gas to said combustor.

5. An emergency power unit according to claim 4 further comprising:

a regulator disposed between said oxidizing gas bottle and said combustor heat exchanger for regulating the pressure of said heated oxidizing gas flowing from said oxidizing gas bottle to said combustor heat exchanger.

6. An emergency power unit according to claim 5 further comprising:

a thermostatically controlled valve communicating between a point between said oxidizing gas bottle and said combustor heat exchanger and a second point between said combustor heat exchanger and said oxidizing gas bottle heat exchanger;

a temperature sensor for sensing the temperature of said pressurized air within said oxidizing gas bottle;

a controller having a set point wherein said controller controls said thermostatically controlled valve and compares the temperature sensed by said temperature sensor to said set point; and said controller outputs a control signal based on the comparison of the temperature sensed by said temperature sensor and said set point and wherein said thermostatically controlled valve is opened or closed in proportion to said control signal permitting a quantity of oxidizing gas in proportion to said control signal to flow from said first point through said thermostatically controlled valve to said second point.

* * * * *